March 13, 1951
S. R. PARKER
2,544,855
TAIL WHEEL JACK
Filed Jan. 18, 1949
2 Sheets-Sheet 1
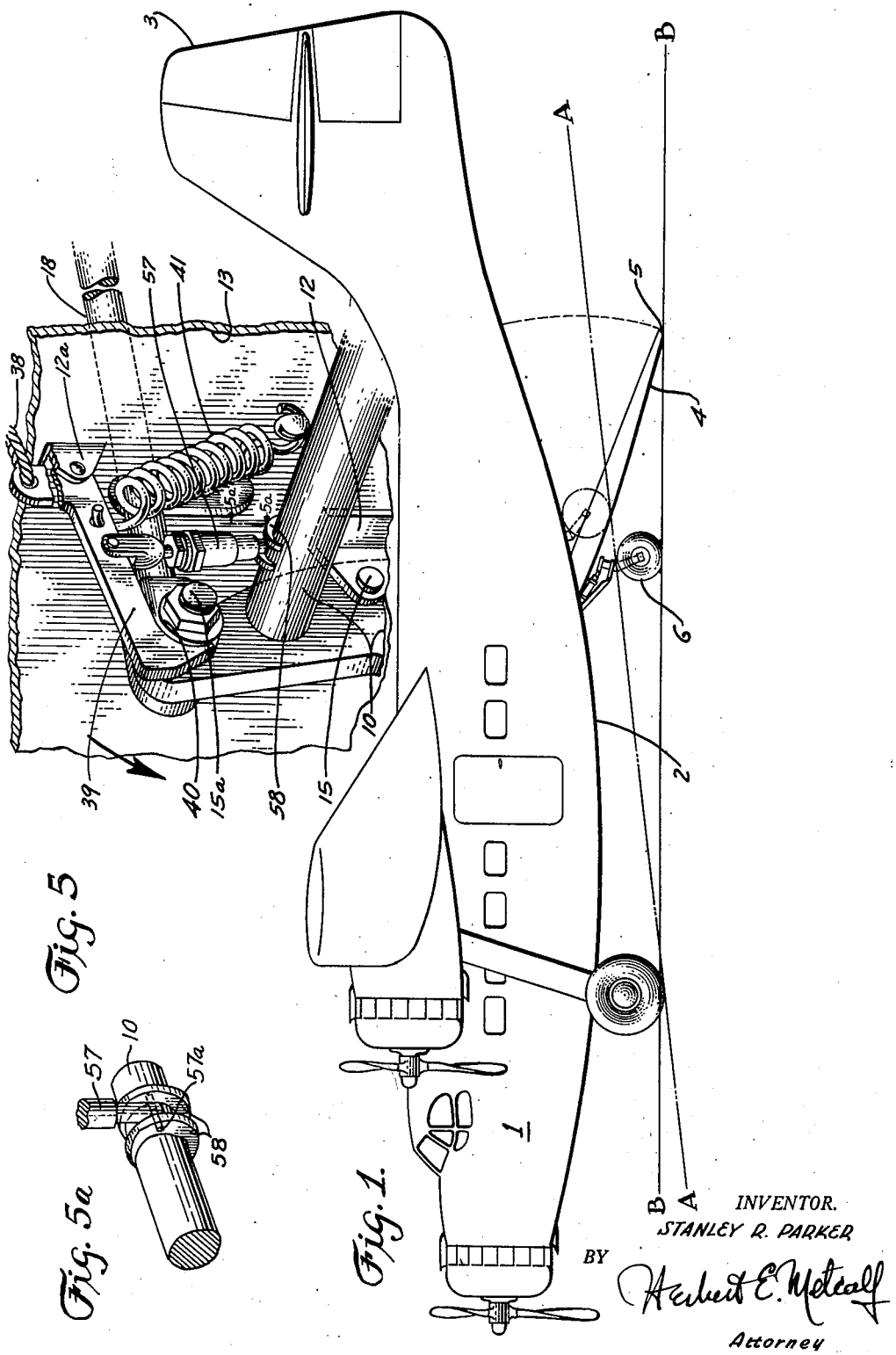
INVENTOR.
STANLEY R. PARKER
BY
Herbert E. Metcalf
Attorney March 13, 1951
S. R. PARKER
2,544,855
TAIL WHEEL JACK
Filed Jan. 18, 1949
2 Sheets-Sheet 2
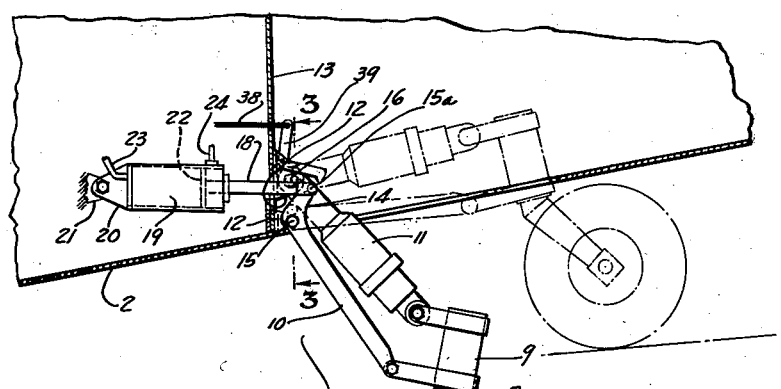
INVENTOR.
STANLEY R. PARKER
BY
Herbert E. Metcalf
Attorney Patented Mar. 13, 1951

2,544,855

UNITED STATES PATENT OFFICE 2,544,855

TAIL WHEEL JACK

Stanley R. Parker, Los Angeles, Calif., assignor to Northrop Aircraft, Inc., Hawthorne, Calif., a corporation of California Application January 18, 1949, Serial No. 71,436

4 Claims. (Cl. 244—102)

This invention relates to airplanes, and more particularly to a means and method for leveling an airplane having a conventional landing gear.

In airplanes equipped with a conventional landing gear consisting of two main wheels forward of the center of gravity and a tail wheel to the rear, the normal resting position on the ground places the plane of the airplane floor at a substantial angle to the horizontal. When an airplane of this type is designed for the transport of cargo, the loading and unloading operations, particularly for wheeled vehicles or other rolling equipment, presents a difficult problem.

Another disadvantage of the normal airplane angularity arises from the fact that airplanes of this type, having a rear-loading ramp door, do not provide sufficient head room under the airplane near the ramp for large objects being loaded. However, if these difficulties can be overcome, a very desirable airplane will result.

It is, therefore, an object of this invention to provide a jacking means which will raise the tail of the airplane, thus providing tail clearance for loading and unloading through the ramp door, and giving a level inside floor surface.

In order to eliminate time-consuming procedures in finding, unpacking, and positioning special tools and equipment to raise the airplane by separate external jacking means, it is a further object of the present invention to provide a jacking means completely integral with the airplane landing gear, and which is always in a position ready for use.

Still another object of this invention is to provide a jacking tail wheel which will operate satisfactorily under all conditions of ground surface, with an amount of over-travel available in case very soft or muddy ground is encountered, to assure adequate lift. Other objects and features of advantage will be apparent upon reading the description of a preferred apparatus to follow, but the invention is not deemed to be limited to the specific apparatus disclosed herein, as various embodiments can be utilized without departing from the essential principles.

In broad terms, the present invention comprises a jacking tail gear, including a tail wheel mounted on a strut which is pivoted within the fuselage structure, and provided with power means operable to extend or retract this wheel and strut relative to the fuselage.

This invention may be more fully understood by reference to the accompanying drawings, shown by way of illustration and not limitation, wherein:

Figure 1 is a side elevation view showing a cargo transport airplane with a loading ramp door and a tail gear assembly incorporating the present invention.

Figure 2 is a side elevation view, partly sectional, showing the components of the tail gear assembly for jacking the airplane of Figure 1.

Figure 3 is a cross-sectional view taken as indicated by broken line 3—3 in Figure 2, showing the location and arrangement of the tail gear attachment points.

Figure 4 is a schematic diagram showing the hydraulic and control circuit for the jacking tail wheel system of Figure 2.

Figure 5 is an enlarged perspective view showing a preferred tail gear uplock connection.

Figure 5a is a fragmentary perspective view taken as indicated by arrows 5a in Figure 5.

Referring first to Figure 1 for a detailed description of my invention, an airplane 1 having a fuselage 2 forming a cargo hold, and a conventional tail structure 3, is provided with a ramp door 4 swinging downwardly at the rear edge 5 about a forward hinge line. The rear edge 5 rests upon the ground, when open, and thus the door 4 forms a loading ramp for straight-away rear loading of vehicles, personnel, or bulk cargo into the fuselage 2.

A dual wheel tail gear 6 is located forward of the ramp door 4, thereby allowing a clear approach to the door 4. This tail gear 6 is movable between a retracted position a short distance from the fuselage 2, as shown by phantom lines, and an extended position farther from the fuselage, as shown by solid lines. When the gear is retracted, the airplane rests on the ground line indicated at A—A, and when extended, on ground line B—B. In this latter position, the tail of the fuselage 2 is elevated so that the cargo hold floor is on a level plane.

In Figure 2, the tail gear 6 comprises a dual tail wheel 7 axled on a swivel post 8, a post housing 9, and an A-frame 10 and a shock absorber 11, both pivotally attached to the post housing 9 at the outer end and horizontally pivoted within the fuselage 2 on structural brackets 12 fixed to a bulkhead 13.

The A-frame 10 has a short frame extension 14 fixed to each side of the frame which extends above the frame pivots 15, while the shock absorber 11 is connected slightly above the frame pivots 15 on a shock pivot 16 located at the airplane center line 17, which construction is further shown in Figure 3. To each frame extension 14 is pin-connected by a bolt 15a a piston rod 18 extending forwardly to enter a hydraulic jacking cylinder 19 pivotally supported at its forward end 20 to the fuselage structure 21. The piston rod 18 terminates with the customary piston 22 enclosed within the jacking cylinder 19, and the cylinder is provided with cylinder "jack" and "down" ports 23 and 24 respectively.

As so far described, it is evident that as pressure is exerted at the cylinder "jack" port 23, the piston 22 and piston rod 18 will be forced rearwardly, rotating the A-frame 10 clockwise about the frame pivots 15, thus extending and rotating the tail wheel 7 forward, to raise the tail of the fuselage 2. During the jacking operation, relative rotation takes place at both ends of A-frame 10 and at both ends of the shock absorber 11. The upper ends of each of these members being fixed to the fuselage 2 on two different center lines, the axis of the post housing 9 will change slope during this operation, as illustrated in Figure 2.

Operation of the hydraulic circuit for controlling the action of the jacking cylinders 19 is shown in Figure 4. A control handle 28 is located within the airplane at a convenient spot for an operator's location. This handle 28 has three positions, one for jacking the tail up, one neutral, and one for letting the tail down. At neutral, a slot or hole is preferably provided in a handle quadrant 29 for a spring-loaded handle pin 30 to engage and, therefore, hold the handle 28 in this position. This handle 28 is rotatably mounted on a handle pivot 31 and carries a handle pulley 32 around which is attached a control cable 33.

The control cable 33 passes over cable pulleys 34 and wraps around a lever pulley 35 to which is attached a lever 36. A short leg 37 of the lever 36 is fastened to one end of an uplock 39, shown in more detail in Figure 5. Here the uplock 39 is pivoted in an uplock support 12a fixed to the bulkhead 13. One piston rod bolt 15a carries a roller 40 which is engaged with the uplock 39 when the A-frame is in its retracted position.

The uplock is elastically held in a locked position by a spring 41. In the locked position, the uplock 39 holds the tail gear 6 in the retracted position (tail down) with the pistons 22 bottomed against the retraction ends of the jacking cylinders 19. The purpose of this design is to let the jacking cylinders take the landing loads that are exerted on the A-frame 10, rather than "bumping" the hydraulic fluid. Pulling of the uplock cable 38 by rotation of the lever 36 will unlock the uplock 39 and allow the gear to be extended.

A long leg 42 (Figure 4) of the lever 36 is connected through a push-pull rod 43 to a valve arm 44. Valve arm 44 operates a four-way selector valve 45 which contains a pressure port 46, valve "jack" port 47, return port 48, and valve "down" port 49. Selector valve 45 has three positions corresponding to the three positions of the control handle 28. In the "tail up" position, pressure port 46 is opened to valve "jack" port 47 and return port 48 is opened to valve "down" port 49. In the neutral position, the valve is closed at all ports. In the "tail down" position, pressure port 46 is opened to valve "down" port 49 and return port 48 is opened to valve "jack" port 47. Pressure port 46 is connected to the high pressure side of an airplane hydraulic power system, and return port 48 is connected through a return T 50 to the return side of the hydraulic system.

Valve "jack" port 47 is connected through a restrictor-check valve 51 to a pressure T 52. One side of pressure T 52 is connected through a manually-operated check valve 53 to the cylinder "jack" port 23 of one of the jacking cylinders 19. The other side of pressure T 52 is similarly connected through another manual check valve 53 to the cylinder "jack" port 23 of the other jacking cylinder 19. Restrictor-check valve 51 allows unrestricted flow toward the jacking cylinders, but restricts flow away from the cylinders to a low rate per unit of time. Manual check valves 53 each allow unrestricted flow toward the jacking cylinders 19, and entirely block any flow away from the cylinders, unless they are opened by external pressure on buttons 54, in which case they are open to unrestricted flow in either direction.

Valve "down" port 49 is connected through a line T 55 to each cylinder "down" port 24. Both manual check valves 53 are located in position to be opened by valve arm 44 when control handle 28 is placed in the "tail down" position.

The operation cycle is then as follows, assuming the tail gear 6 to be retracted with uplock 39 locked: control handle 28, being placed in the "tail up" position, rotates lever pulley 35 counterclockwise, thus pulling uplock cable 38 to unlock the uplock 39 against the pull of spring 41. The various linkages and cable connections are adjusted so that slightly after the uplock 39 opens, lever 36 turns valve arm 44 far enough to place selector valve 45 in the "tail up" position. This, as described above, admits hydraulic fluid under pressure to valve "jack" port 47, and fluid then flows through the three check valves, all open, to the cylinder "jack" ports 23, thus forcing pistons 22 to the rear to extend the tail gear 6. Since return port 48 is open to valve "down" port 49, fluid on the retraction side of jacking cylinders 19 is allowed to flow through cylinder "down" ports 24, through the selector valve 45, and into the return side of the hydraulic system.

When the tail has been raised the desired amount, control handle 28 is returned to neutral. It will return to neutral of its own accord when released, due to the action of uplock spring 41. Valve arm 44 is thus returned to the neutral position, closing selector valve 45 and stopping all fluid flow in the tail gear system. In this position, hydraulic fluid under pressure in the jacking cylinders 19 is prevented from leaking back out to the pressure side of the hydraulic system at two places for each cylinder. Each manual check valve 53 is closed to this reverse flow and the selector valve 45 is also closed. By means of these valves, the hydraulic supply pressurizing means may be shut off, and the tail gear is assured of remaining extended.

To lower the airplane, control handle 28 is placed in the "tail down" position. Lever pulley 35 is thus rotated clockwise, moving valve arm 44 to the "tail down" position. As can be seen in Figure 4, valve arm 44 will now contact buttons 54 on manual check valves 53 and open them, allowing free flow. Substantially simultaneously with this check valve opening, selector valve 45 will have reached its "tail down" position, so that hydraulic fluid is now forced out of the extension side of jacking cylinders 19, through manual check valves 53, restrictor-check valve 51, and from valve "jack" port 47 to return port 48, where it joins the return lines. However, a sudden retraction is not permitted, because of the restricted flow through restrictor-check valve 51, as described previously. This prevents jerky operation and possible damage caused by the airplane's banging down into position under heavy loads.

As the tail gear 6 thus approaches its retracted position, and the airplane tail is settling down, uplock 39 will latch into place just as the pistons 22 reach the end of their stroke, stopping further motion. Control handle 28 is then returned to neutral, and the cycle has been completed.

While the airplane is in the jacked position, provision is made to prevent damage due to thermal expansion of fluid locked in the system. This is accomplished by installing a thermal relief valve 56 directly between the jacking cylinders 19 and the return port 48, as shown in Figure 4. By putting this thermal relief valve 56 in the "down" side of the jacking cylinders 19, after the two have been joined at the line T 55, only one such valve is required, whereas two would be necessary if located on the "jack" side, one between each cylinder and its corresponding manual check valve 53.

Another feature of the present invention is shown in Figure 5. To prevent overtravel of the tail gear 6 in the extended direction, an adjustable link 57 is connected between the uplock 39 and a lug 58 on the A-frame 10 by a pin 57a. This link is made of slidable sections allowing the link to shorten to a fixed minimum length or extend to an adjustable maximum length. The adjustment is regulated so that as the gear is extending, the link 57 will reach its maximum length and pull the uplock 39 toward its locked position when the extension has almost reached its limit. As the uplock 39 rotates in this manner, it will pull on the uplock cable 38 which in turn will move the control handle 28 and the selector valve 45 toward the neutral position. Therefore, when neutral is reached, the selector valve 45 will be closed, and further extension is prohibited. This position of the tail gear 6 defines the maximum jacked position, and prevents the pistons 22 from bottoming against the extension ends of the jacking cylinders 19. In the retracted position of the gear, the uplock 39 is locked and the adjustable link 57 is contracted to a position near its minimum length.

A small amount of clearance is left in the jacking cylinders 19 between the maximum jacked position and the fully extended position of the tail gear so that the pistons 22 will not be forced against the cylinder caps due to possible thermal expansion. Furthermore, the maximum jacked position is substantially farther than the normal jacked position required to level the airplane on hard ground, in order to allow for occasions when muddy ground is encountered and the tail wheel sinks below the top surface.

In flight and during take-off and landing, the device of the present invention acts as a conventional tail wheel. In this respect, it is noted that the A-frame 10 is held stationary with respect to the fuselage 2 by the uplock 39 and jacking cylinders 19. Therefore, the shock absorber 11 comes into play by allowing the tail wheel 7 to rotate about its attachment to the A-frame 10 as the shock absorber changes length. After landing, the tail gear is extended as required, bringing the airplane to a level position.

Thus, it is clearly seen that by achieving the various objects noted herein, this invention has greatly increased the utility of a conventional type airplane of the simplest possible design, making it ideally suited for use as a general purpose transport.

In addition to the use as a loading aid, the present device can be used to level or lift the airplane for any other reason, such as rigging procedures, bore-sighting of guns, and determination of other data.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an airplane having a landing gear, a tail wheel construction comprising a tail wheel, a substantially vertical tail wheel support, a pair of substantially parallel forwardly extending brackets on said support positioned one above the other, a pair of substantially parallel struts hinged at one end to said airplane, said struts being one above the other, the other ends of said struts being hinged to the respective upper and lower brackets, a shock absorber in the upper strut, a bell crank lever attached to the lower strut adjacent its airplane hinge attachment, a hydraulic cylinder and piston connected to rotate said struts in a vertical plane when energized, a valve controlling the flow of hydraulic fluid to said cylinder and piston, means in said airplane under the control of an operator for moving said valve, and means moving with said struts for preventing overtravel of said struts.

2. In an airplane having a landing gear, a tail wheel construction comprising a tail wheel, a substantially vertical tail wheel support, a pair of substantially parallel forwardly extending brackets on said support positioned one above the other, a pair of substantially parallel struts hinged at one end to said airplane, said struts being one above the other, the other ends of said struts being hinged to the respective upper and lower brackets, a shock absorber in the upper strut, a bell crank lever attached to the lower strut adjacent its airplane hinge attachment, a hydraulic cylinder and piston connected to rotate said struts in a vertical plane when energized, a valve controlling the flow of hydraulic fluid to said cylinder and piston, means in said airplane under the control of an operator for moving said valve, means moving with said struts for preventing overtravel of said struts, and a gear uplock operable by said operator's control means.

3. In an airplane having a landing gear, a tail wheel construction comprising a tail wheel, a substantially vertical tail wheel support, a pair of substantially parallel forwardly extending brackets on said support positioned one above the other, a pair of substantially parallel struts hinged at one end to said airplane, said struts being one above the other, the other ends of said struts being hinged to the respective upper and lower brackets, a shock absorber in the upper strut, a bell crank lever attached to the lower strut adjacent its airplane hinge attachment, a hydraulic cylinder and piston connected to rotate said struts in a vertical plane when energized, a valve controlling the flow of hydraulic fluid to said cylinder and piston, said valve having a strut retracting position, a neutral strut locking position and a strut extending position, valve actuating means in said airplane under the control of an operator for moving said valve to said positions, and means mechanically connecting said valve with said struts when a predetermined downward extension of said gear has been reached after prior movement of said valve to said strut extending position to automatically move said valve back to said neutral position.

4. In an airplane having a landing gear, a tail wheel construction comprising a tail wheel, a substantially vertical tail wheel support, a pair of substantially parallel forwardly extending brackets on said support positioned one above the other, a pair of substantially parallel struts hinged at one end to said airplane, said struts being one above the other, the other ends of said struts being hinged to the respective upper and lower brackets, a shock absorber in the upper strut, a bell crank lever attached to the lower strut adjacent its airplane hinge attachment, a hydraulic cylinder and piston connected to rotate said struts in a vertical plane when energized, a valve controlling the flow of hydraulic fluid to said cylinder and piston, said valve having a strut retracting position, a neutral strut locking position and a wheel extending position, a first member connected to move with said struts, an uplock positioned to be engaged by said member when said struts are in retracted position, resilient means urging said uplock to a first member engaging position, valve actuating means in said airplane under the control of an operator for moving said valve to said positions and also connected to move said uplock away from said first member engaging position when said valve actuating means is moved from the neutral position to a strut extending position, a second member connected to move with said struts, and means mechanically connecting said uplock with said second member when a predetermined downward extension of said struts has been reached after prior movement of said valve to a strut extending position, to move said uplock toward said member engaging position thereby moving said valve back to neutral position and preventing over-extension of said struts.

STANLEY R. PARKER.

REFERENCES CITED

The following references are of record in the file of this patent:

UNITED STATES PATENTS

| Number | Name | Date |
|---|---|---|
| 1,918,426 | Radnor | July 18, 1933 |
| 2,075,042 | Knerr | Mar. 30, 1937 |
| 2,182,333 | Cowey | Dec. 5, 1939 |
| 2,242,125 | Hineman | May 13, 1941 |

FOREIGN PATENTS

| Number | Country | Date |
|---|---|---|
| 205,464 | Great Britain | Dec. 17, 1924 |
| 527,994 | Great Britain | Oct. 21, 1940 |
| 814,014 | France | Mar. 8, 1937 |